(12) United States Patent
Liu et al.

(10) Patent No.: US 12,264,612 B2
(45) Date of Patent: Apr. 1, 2025

(54) MIXERS FOR USE IN AFTERTREATMENT SYSTEMS

(71) Applicant: Cummins Emission Solutions Inc., Columbus, IN (US)

(72) Inventors: Z. Gerald Liu, Madison, WI (US); Apoorv Kalyankar, Madison, WI (US); Achuth Munnannur, Verona, WI (US)

(73) Assignee: Cummins Emission Solutions Inc., Columbus, IN (US)

(*) Notice: Subject to any disclaimer, the term of this patent is extended or adjusted under 35 U.S.C. 154(b) by 163 days.

(21) Appl. No.: 17/802,494

(22) PCT Filed: Feb. 11, 2021

(86) PCT No.: PCT/US2021/017551
§ 371 (c)(1),
(2) Date: Aug. 25, 2022

(87) PCT Pub. No.: WO2021/173357
PCT Pub. Date: Sep. 2, 2021

(65) Prior Publication Data
US 2023/0143888 A1   May 11, 2023

Related U.S. Application Data

(60) Provisional application No. 62/982,354, filed on Feb. 27, 2020.

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9431* (2013.01); *B01F 23/2132* (2022.01);
(Continued)

(58) Field of Classification Search
CPC .. B01F 35/55; B01F 25/4316; B01F 25/3141; B01F 25/103; B01F 23/2132;
(Continued)

(56) References Cited

U.S. PATENT DOCUMENTS

| 1,104,963 A | 7/1914 | Coanda |
| 3,699,407 A | 10/1972 | Gurtler et al. |

(Continued)

FOREIGN PATENT DOCUMENTS

| CN | 1864835 A | 11/2006 |
| CN | 101501308 A | 8/2009 |

(Continued)

OTHER PUBLICATIONS

Examination Report in UK Patent Application No. GB2305850.6 issued May 26, 2023.
(Continued)

*Primary Examiner* — Kenneth J Hansen
*Assistant Examiner* — Kelsey L Stanek
(74) *Attorney, Agent, or Firm* — Foley & Lardner LLP

(57) ABSTRACT

An aftertreatment system comprises: a housing, a SCR system disposed in the housing. A mixer is disposed upstream of the SCR system and includes: a hub, a tubular member disposed circumferentially around the hub and defining a reductant entry port, and plurality of vanes extending from the hub to the tubular member such that openings are defined between adjacent vanes. The plurality of vanes swirl the exhaust gas in a circumferential direction. A reductant injector is disposed on the housing upstream of the SCR system along a transverse axis and configured to insert a reductant into the exhaust gas flowing through the housing through the reductant entry port. The reductant is inserted at a non-zero angle with respect to the transverse axis opposite the circumferential direction to achieve virtual
(Continued)

interception. A mixer central axis is radially offset with respect to a housing central axis of the housing.

20 Claims, 6 Drawing Sheets

(51) Int. Cl.
  *B01F 23/213* (2022.01)
  *B01F 25/10* (2022.01)
  *B01F 25/314* (2022.01)
  *B01F 25/431* (2022.01)
  *B01F 35/00* (2022.01)
  *F01N 3/20* (2006.01)
  *B01F 25/00* (2022.01)

(52) U.S. Cl.
  CPC ........ *B01F 25/103* (2022.01); *B01F 25/3141* (2022.01); *B01F 25/4316* (2022.01); *B01F 35/55* (2022.01); *F01N 3/2066* (2013.01); *B01F 2025/913* (2022.01); *F01N 2610/1453* (2013.01)

(58) Field of Classification Search
  CPC ........... B01F 2025/913; B01D 53/9431; F01N 3/2066; F01N 2610/1453
  USPC ........................................................ 422/168
  See application file for complete search history.

(56) References Cited

U.S. PATENT DOCUMENTS

| | | | |
|---|---|---|---|
| 4,424,777 A | 1/1984 | Klomp | |
| 6,444,177 B1 | 9/2002 | Muller et al. | |
| 7,127,884 B2 | 10/2006 | Worner et al. | |
| 7,581,387 B2 | 9/2009 | Bui et al. | |
| 7,793,490 B2 | 9/2010 | Amon et al. | |
| 7,836,688 B2 | 11/2010 | Woerner et al. | |
| 7,866,143 B2 | 1/2011 | Buhmann et al. | |
| 8,033,101 B2 | 10/2011 | Amon et al. | |
| 8,230,678 B2 | 7/2012 | Aneja et al. | |
| 8,371,114 B2 | 2/2013 | Hayashi et al. | |
| 8,375,708 B2 | 2/2013 | Forster et al. | |
| 8,460,610 B2 | 6/2013 | Silver et al. | |
| 8,607,555 B2 | 12/2013 | Kaiser et al. | |
| 8,615,984 B2 | 12/2013 | Kornherr et al. | |
| 8,695,330 B2 | 4/2014 | Davidson et al. | |
| 8,776,509 B2 | 7/2014 | Wikaryasz et al. | |
| 8,789,363 B2 | 7/2014 | Iverson et al. | |
| 9,021,794 B2 | 5/2015 | Goss et al. | |
| 9,133,744 B2 | 9/2015 | Birkby et al. | |
| 9,248,404 B2 | 2/2016 | Brunel et al. | |
| 9,266,075 B2 | 2/2016 | Chapman et al. | |
| 9,267,417 B2 | 2/2016 | Baldwin et al. | |
| D757,919 S | 5/2016 | Kimura | |
| 9,328,640 B2 | 5/2016 | Iverson et al. | |
| 9,346,017 B2 | 5/2016 | Greber | |
| 9,352,276 B2 | 5/2016 | Sampath | |
| 9,453,444 B2 | 9/2016 | Fischer et al. | |
| 9,464,546 B2 | 10/2016 | Perrot et al. | |
| 9,504,960 B2 | 11/2016 | Park | |
| 9,581,067 B2 | 2/2017 | Guilbaud et al. | |
| D781,071 S | 3/2017 | Callif et al. | |
| 9,605,573 B2 | 3/2017 | Solbrig et al. | |
| 9,644,516 B1 | 5/2017 | Chiruta et al. | |
| 9,664,081 B2 | 5/2017 | Rusch et al. | |
| 9,714,598 B2 | 7/2017 | Alano et al. | |
| D794,100 S | 8/2017 | McDonald et al. | |
| 9,726,064 B2 | 8/2017 | Alano | |
| 9,737,908 B2 | 8/2017 | Hornback et al. | |
| 9,776,135 B2 | 10/2017 | Boeshans et al. | |
| D809,577 S | 2/2018 | McDonald et al. | |
| D816,010 S | 4/2018 | Rike | |
| 9,995,193 B2 | 6/2018 | Alano et al. | |
| 10,024,217 B1 | 7/2018 | Johnson et al. | |
| 10,030,564 B2 | 7/2018 | Cossard et al. | |
| 10,174,658 B2 | 1/2019 | Dimpelfeld et al. | |
| 10,190,465 B2 | 1/2019 | Alano et al. | |
| D840,908 S | 2/2019 | Rike | |
| 10,215,075 B2 | 2/2019 | Chapman et al. | |
| 10,247,081 B2 | 4/2019 | Niaz | |
| 10,273,853 B2 | 4/2019 | Golin | |
| 10,273,854 B1 | 4/2019 | Abbassi et al. | |
| D849,662 S | 5/2019 | Rike | |
| 10,287,948 B2 | 5/2019 | Moulieres et al. | |
| 10,287,954 B2 | 5/2019 | Chapman et al. | |
| 10,294,843 B2 | 5/2019 | Alano et al. | |
| 10,316,721 B1 | 6/2019 | Moulieres et al. | |
| D855,090 S | 7/2019 | McDonald et al. | |
| 10,337,379 B2 | 7/2019 | Dimpelfeld et al. | |
| 10,337,380 B2 | 7/2019 | Willats et al. | |
| 10,422,268 B2 | 9/2019 | Niaz | |
| 10,533,478 B2 | 1/2020 | Alano | |
| 10,577,995 B2 | 3/2020 | Ker et al. | |
| 10,612,443 B2 | 4/2020 | Li et al. | |
| 10,632,430 B1 | 4/2020 | Liu et al. | |
| 10,731,536 B1 | 8/2020 | Chenoweth et al. | |
| 10,787,946 B2 | 9/2020 | Rohde et al. | |
| 10,808,587 B2 | 10/2020 | Ottaviani et al. | |
| 10,823,032 B2 | 11/2020 | Willats et al. | |
| 10,907,522 B2 | 2/2021 | Poinsot et al. | |
| 10,914,218 B1 | 2/2021 | Chapman et al. | |
| 10,920,635 B2 | 2/2021 | Kozakiewicz | |
| 10,920,642 B2 | 2/2021 | Wang et al. | |
| 10,933,387 B2 | 3/2021 | Cvelbar | |
| 10,967,329 B2 | 4/2021 | Alano et al. | |
| 11,085,346 B2 | 8/2021 | Tucker et al. | |
| 11,105,241 B2 | 8/2021 | Tucker et al. | |
| 11,143,084 B2 | 10/2021 | Wahlstrom | |
| 11,193,407 B2 | 12/2021 | Lee et al. | |
| 11,193,412 B2 | 12/2021 | Cvelbar et al. | |
| 11,230,958 B2 | 1/2022 | Tucker et al. | |
| 11,242,788 B2 | 2/2022 | Kinnaird | |
| 11,242,790 B2 | 2/2022 | Chapman et al. | |
| 11,268,424 B2 | 3/2022 | Kimura et al. | |
| 11,300,028 B2 | 4/2022 | Meunier | |
| 11,313,266 B2 | 4/2022 | Tucker et al. | |
| 11,428,140 B1 | 8/2022 | Kinnaird et al. | |
| 11,441,461 B2 | 9/2022 | Röhr et al. | |
| 11,459,927 B2 | 10/2022 | Rajashekharaiah et al. | |
| 11,459,929 B2 | 10/2022 | Dimpelfeld et al. | |
| 11,506,101 B2 | 11/2022 | Luca et al. | |
| 11,591,943 B2 | 2/2023 | Hornback | |
| 11,746,684 B2 | 9/2023 | Wahlstrom | |
| 11,761,365 B2 | 9/2023 | Liu et al. | |
| 2002/0023435 A1 | 2/2002 | Woerner et al. | |
| 2004/0112883 A1 | 6/2004 | Bowden et al. | |
| 2004/0237511 A1 | 12/2004 | Ripper et al. | |
| 2005/0172615 A1 | 8/2005 | Mahr | |
| 2005/0262843 A1 | 12/2005 | Monty | |
| 2006/0150614 A1 | 7/2006 | Cummings | |
| 2006/0153748 A1 | 7/2006 | Huthwohl et al. | |
| 2006/0191254 A1 | 8/2006 | Bui et al. | |
| 2006/0260104 A1 | 11/2006 | Himi | |
| 2006/0266022 A1 | 11/2006 | Woerner et al. | |
| 2006/0283181 A1 | 12/2006 | Crawley et al. | |
| 2007/0144126 A1 | 6/2007 | Ohya et al. | |
| 2007/0163241 A1 | 7/2007 | Meingast et al. | |
| 2007/0245718 A1 | 10/2007 | Cheng et al. | |
| 2007/0283683 A1 | 12/2007 | Bellinger | |
| 2007/0289294 A1 | 12/2007 | Werni et al. | |
| 2008/0087013 A1 | 4/2008 | Crawley et al. | |
| 2008/0121179 A1 | 5/2008 | Park et al. | |
| 2008/0127635 A1 | 6/2008 | Hirata et al. | |
| 2008/0314033 A1 | 12/2008 | Aneja et al. | |
| 2009/0000283 A1 | 1/2009 | Endicott et al. | |
| 2009/0019843 A1 | 1/2009 | Levin et al. | |
| 2009/0031717 A1 | 2/2009 | Blaisdell | |
| 2009/0049829 A1 | 2/2009 | Kaiser et al. | |
| 2009/0084094 A1 | 4/2009 | Goss et al. | |
| 2009/0145119 A1 | 6/2009 | Farrell et al. | |
| 2009/0158717 A1 | 6/2009 | Kimura et al. | |
| 2009/0158721 A1 | 6/2009 | Wieland et al. | |

(56) References Cited

U.S. PATENT DOCUMENTS

| | | |
|---|---|---|
| 2009/0158722 A1 | 6/2009 | Kojima et al. |
| 2009/0180937 A1 | 7/2009 | Nohl et al. |
| 2009/0229254 A1 | 9/2009 | Gibson |
| 2009/0272106 A1 | 11/2009 | Werni et al. |
| 2010/0083641 A1 | 4/2010 | Makartchouk et al. |
| 2010/0146942 A1 | 6/2010 | Mayr et al. |
| 2010/0146948 A1 | 6/2010 | Dacosta et al. |
| 2010/0187383 A1 | 7/2010 | Olsen et al. |
| 2010/0251719 A1 | 10/2010 | Mancini et al. |
| 2010/0319329 A1 | 12/2010 | Khadiya |
| 2011/0005232 A1 | 1/2011 | Williams et al. |
| 2011/0079003 A1 | 4/2011 | Sun et al. |
| 2011/0094206 A1 | 4/2011 | Liu et al. |
| 2011/0099978 A1 | 5/2011 | Davidson et al. |
| 2011/0146237 A1 | 6/2011 | Adelmann et al. |
| 2011/0146253 A1 | 6/2011 | Isada et al. |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0333363 A1 | 12/2013 | Joshi et al. |
| 2014/0033686 A1 | 2/2014 | Fischer et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0204227 A1 | 7/2015 | Eager |
| 2015/0218996 A1* | 8/2015 | Brandl .................. F01N 3/2066 60/295 |
| 2015/0224870 A1 | 8/2015 | Shin et al. |
| 2015/0233276 A1 | 8/2015 | Cassity et al. |
| 2015/0360176 A1 | 12/2015 | Bui et al. |
| 2016/0061090 A1 | 3/2016 | Anand et al. |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1 | 7/2016 | Clayton et al. |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2016/0376969 A1 | 12/2016 | Zhang et al. |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1 | 12/2017 | Zoran et al. |
| 2017/0370262 A1 | 12/2017 | Zoran et al. |
| 2018/0058294 A1* | 3/2018 | Zhang .................. F01N 3/2066 |
| 2018/0066559 A1 | 3/2018 | Haverkamp et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1* | 10/2018 | Sampath ............ B01F 25/3141 |
| 2018/0313247 A1 | 11/2018 | Bauknecht et al. |
| 2019/0063294 A1 | 2/2019 | Johnson et al. |
| 2019/0107025 A1 | 4/2019 | Brinkmeyer |
| 2019/0323397 A1 | 10/2019 | Pill et al. |
| 2020/0102873 A1 | 4/2020 | Ramolivo et al. |
| 2020/0123955 A1 | 4/2020 | Liu et al. |
| 2020/0131969 A1 | 4/2020 | Tucker et al. |
| 2020/0325811 A1* | 10/2020 | Levin ..................... F01N 13/08 |
| 2020/0332696 A1 | 10/2020 | Chapman et al. |
| 2021/0039056 A1 | 2/2021 | De Rudder et al. |
| 2021/0095587 A1 | 4/2021 | Cvelbar et al. |
| 2021/0199039 A1 | 7/2021 | Panunzio et al. |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 101815851 A | 8/2010 |
| CN | 102242662 A | 11/2011 |
| CN | 103429864 A | 12/2013 |
| CN | 105143628 A | 12/2015 |
| CN | 105612325 A | 5/2016 |
| CN | 105715340 A | 6/2016 |
| CN | 205559030 U | 9/2016 |
| CN | 106321199 | 1/2017 |
| CN | 106377919 A | 2/2017 |
| CN | 206144632 U | 5/2017 |
| CN | 206144633 U | 5/2017 |
| CN | 106968765 A | 7/2017 |
| CN | 107435576 A | 12/2017 |
| CN | 107829805 A | 3/2018 |
| CN | 108194176 A | 6/2018 |
| CN | 108252771 A | 7/2018 |
| CN | 108708781 A | 10/2018 |
| CN | 108729999 A | 11/2018 |
| CN | 109268107 A | 1/2019 |
| CN | 109414661 A | 3/2019 |
| CN | 109477413 A | 3/2019 |
| CN | 208982145 U | 6/2019 |
| CN | 106014560 B | 7/2019 |
| CN | 209179849 U | 7/2019 |
| CN | 209586479 U | 11/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 A | 10/2020 |
| CN | 212130586 U | 12/2020 |
| CN | 212130587 U | 12/2020 |
| CN | 212296579 U | 1/2021 |
| CN | 112483224 A | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217872989 U | 11/2022 |
| DE | 10021166 A1 | 11/2001 |
| DE | 10312212.3 | 11/2003 |
| DE | 10 2004 043 931 A | 3/2006 |
| DE | 10 2010 014 037 A1 | 11/2010 |

(56) References Cited

FOREIGN PATENT DOCUMENTS

| | | |
|---|---|---|
| DE | 11 2009 000 650 T5 | 1/2011 |
| DE | 11 2010 002 589 T5 | 11/2012 |
| DE | 10 2014 101 889 | 8/2015 |
| DE | 10 2014 102 798 A1 | 9/2015 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| DE | 10 2020 121 659 A1 | 3/2021 |
| EP | 0 716 918 A2 | 6/1996 |
| EP | 1 716 917 A1 | 11/2006 |
| EP | 2 769 762 A1 | 8/2014 |
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |
| EP | 3 699 407 A1 | 8/2020 |
| EP | 3 775 514 A1 | 2/2021 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| GB | 2 558 311 A | 7/2018 |
| IN | 201921025624 A | 1/2021 |
| JP | 2003-056274 A | 2/2003 |
| JP | 2009-156077 A | 7/2009 |
| JP | 2010-180863 A | 8/2010 |
| JP | 2013-133774 A | 7/2013 |
| WO | WO-2009/024815 A2 | 2/2009 |
| WO | WO-2009/024815 A3 | 2/2009 |
| WO | WO-2010/146285 A1 | 12/2010 |
| WO | WO-2011/110885 A1 | 9/2011 |
| WO | WO-2012/110720 A1 | 8/2012 |
| WO | WO-2012/123660 A1 | 9/2012 |
| WO | WO-2016/082850 A1 | 6/2016 |
| WO | WO-2016/111701 A1 | 7/2016 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019/143373 A1 | 7/2019 |
| WO | WO-2020/009713 A1 | 1/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 A1 | 11/2021 |

OTHER PUBLICATIONS

Office Action in Chinese Patent Application No. 202180016222.0 issued Mar. 17, 2023.
Office Action in Chinese Patent Application No. 202210283795.6, dated Mar. 20, 2023.
Final Office Action in U.S. Appl. No. 17/695,580 issued Feb. 6, 2023.
Final Office Action in U.S. Appl. No. 13/837,446 issued Jan. 5, 2015.
First Examination Report in Indian Patent Application No. 202247030005, issued Jul. 13, 2022.
Office Action in German Patent Application No. 102014002750.3, issued Jan. 24, 2022, 5.
International Search Report and Written Opinion for International Patent Application No. PCT/US2020/062718 issued Feb. 19, 2021.
International Search Report and Written Opinion issued for PCT Application No. PCT/US2021/029282 issued Jul. 27, 2021.
Office Action in U.S. Appl. No. 17/923,804 issued Mar. 16, 2023.
Search Report and Written Opinion issued for PCT Application No. PCT/US2019/064232 issued Feb. 12, 2020.
Office Action in U.S. Appl. No. 13/837,446 issued Aug. 29, 2014.
Office Action in German Patent Application No. 11 2021 005 606.9 issued Dec. 14, 2023.
International Search Report and Written Opinion in PCT Application No. PCT/US2020/050318 issued Dec. 8, 2020.
International Search Report and Written Opinion in PCT Application No. PCT/US2022/038268 issued Oct. 26, 2022.
Non-Final Office Action in U.S. Appl. No. 18/381,116 issued Mar. 28, 2024.
Non-Final Office Action in Design U.S. Appl. No. 29/835,755 issued Oct. 4, 2023.
Non-Final Office Action in Design U.S. Appl. No. 29/835,777 issued Oct. 4, 2023.
Office Action in Chinese Patent Application No. 202180064965.5 issued Sep. 13, 2023.
Extended European Search Report in European Patent Application No. 19955166.4 dated Jul. 10, 2023.
Coanda effect, https://en.wikipedia.org/w/index.php?title=Coand%C4%83_effect&oldid=1000333406 (last visited Mar. 12, 2021).
Combined Search and Examination Report in GB2205057.9, dated May 5, 2022, 6 pages.
Examination Report in U.K. Patent Application No. 1413056.1 dated Sep. 21, 2017, 5 pages.
Examination Report in U.K. Patent Application No. 1805598.8 dated Apr. 24, 2018, 4 pages.
Examination Report for UK Patent Application No. GB 1917608.0 issued Sep. 6, 2021, 3 pages.
Examination Report in GB2117927.0 Dtd Jan. 19, 2022.
First Examination Report in Indian Patent Application No. 201947050068, issued Jan. 13, 2021.
First Examination Report in Indian Application No. 202147057999, dated Mar. 14, 2022.
First Office Action in Chinese Patent Application No. 201880001223.6, issued Dec. 17, 2020, 9 pages.
First Office Action in CN Application No. 2019800973685, issued Mar. 8, 2022.
G. Comes, "Theoretical Modeling, Design and Simulation of an Innovative Diverting Valve Based on Coanda Effect", Fluids 2018, 3, 103, (2018).
International Search Report and Written Opinion in PCT/US2012/022582, issued Oct. 25, 2012, 6 pages.
International Search Report and Written Opinion in PCT/IB2019/054988, issued Jan. 29, 2020, 12 pages.
International Search Report and Written Opinion in PCT/US2021/017551, issued Apr. 28, 2021, 8 pages.
International Search Report and Written Opinion in PCT/US2022/014781, issued Apr. 25, 2022, 14 pages.
International Search Report in PCT/US2018/035959, issued Oct. 19, 2018, pp. 1-4.
Non-Final Office Action in U.S. Appl. No. 15/657,941 issued Aug. 6, 2019.
Non-Final Office Action in U.S. Appl. No. 16/618,716, issued Feb. 23, 2021.
Non-Final Office Action in U.S. Appl. No. 17/400,567, issued May 23, 2022.
Non-Final Office Action in U.S. Appl. No. 17/695,580, issued Jul. 27, 2022.
Preliminary Office Action in BR1120190253246, issued Apr. 26, 2022 (4 pages).
Search and Examination Report issued in GB2116026.2, issued Dec. 20, 2021, 3 pages.

(56) References Cited

OTHER PUBLICATIONS

Search Report issued in UK Patent Application No. GB 2101393.3, issued Feb. 22, 2021, 2 pages.
Search Report Letter issued in UK Patent Application No. GB 2101393.3, issued Feb. 22, 2021, 2 pages.
US Office Action in U.S. Appl. No. 14/372,810, issued Mar. 8, 2017.
US Office Action in U.S. Appl. No. 14/372,810, issued May 25, 2016.
Office Action in U.S. Appl. No. 16/618,716, issued Jan. 4, 2021.
Written Opinion in PCT Application No. PCT/US2018/035959, issued Oct. 19, 2018, pp. 1-8.
Office Action in U.S. Appl. No. 18/033,021 issued Jul. 18, 2023.
Office Action issued in German Patent Application No. DE 11 2012 005 741.4 issued Dec. 7, 2022.
Office Action in U.S. Appl. No. 18/291,362, issued Sep. 6, 2024.

* cited by examiner

MIXERS FOR USE IN AFTERTREATMENT SYSTEMS

CROSS-REFERENCE TO RELATED APPLICATIONS

The present application is a U.S. National Phase Application based on PCT Application No. PCT/US2021/017551, filed Feb. 11, 2021, which claims the benefit of U.S. Provisional Application No. 62/982,354, filed Feb. 27, 2020. The contents of these applications are hereby incorporated by reference in their entireties.

TECHNICAL FIELD

The present disclosure relates generally to aftertreatment systems for use with internal combustion engines.

BACKGROUND

Exhaust aftertreatment systems are used to receive and treat exhaust gas generated by engines such as internal combustion engines. Conventional exhaust gas aftertreatment systems include any of several different components to reduce the levels of harmful exhaust emissions present in exhaust gas. For example, certain exhaust aftertreatment systems for diesel-powered internal combustion engines includes a selective catalytic reduction (SCR) system including a SCR catalyst formulated to convert $NO_x$ (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the SCR catalyst. However, if the reductant is not mixed substantially with the exhaust gas, the inserted reductant may not completely decompose and lead to reductant deposits being formed on walls or various components of the aftertreatment system. Overtime, the reductant deposits can build up and lead to reduction in a SCR catalytic conversion efficiency (CE) of the SCR catalyst. To facilitate mixing, mixers are used or a reductant injector is mounted offset from a flow axis of the exhaust gas. However, reductant deposit formation remains a challenge in aftertreatment systems.

SUMMARY

Embodiments described herein relate generally to mixers for promoting mixing of reductant with exhaust gas flowing through an aftertreatment system and reduce reductant deposits. In particular, embodiments described herein include a multi-vane mixer that includes a central hub defining a flow channel that is radially offset from a longitudinal axis of an aftertreatment housing, and a reductant injector that inserts reductant at a non-zero angle with respect to the transverse axis of the aftertreatment system and opposite a circumferential direction of rotation of the exhaust gas that is caused by the mixer.

In some embodiments, an aftertreatment system for treating constituents of an exhaust gas produced by an engine, comprises: a housing defining a housing central axis; a selective catalytic reduction (SCR) system disposed in the housing; a mixer disposed in the housing upstream of the SCR system, the mixer comprising: a hub, a tubular member disposed circumferentially around the hub and defining a reductant entry port, and a plurality of vanes extending from the hub to the tubular member such that openings are defined between adjacent vanes of the plurality of vanes to allow the exhaust gas to flow therethrough such that the plurality of vanes swirl the exhaust gas in a circumferential direction with respect to an exhaust gas flow path; and a reductant injector disposed on the housing upstream of the SCR system along a transverse axis of the housing and configured to insert a reductant into the exhaust gas flowing through the housing through the reductant entry port, the reductant being inserted at a non-zero angle with respect to the transverse axis opposite the circumferential direction, wherein a mixer central axis of the mixer defined through the hub is radially offset with respect to the housing central axis at a location in the housing that is upstream of the mixer.

In some embodiments, the mixer central axis is horizontally offset from the housing central axis.

In some embodiments, the mixer central axis is vertically offset from the housing central axis.

In some embodiments, the non-zero angle is in a range of 5 degrees to 60 degrees with respect to the transverse axis.

In some embodiments, an auxiliary opening is defined in the tubular member proximate to the reductant entry port.

In some embodiments, the housing defines a circular, square, rectangular, oval, elliptical, or polygonal cross-section.

In some embodiments, the mixer further comprises a flange extending radially outwards from a rim of an upstream end of the tubular member and secured to an inner surface of the housing.

In some embodiments, the aftertreatment system further comprises: a blocking member extending from the hub to the tubular member.

In some embodiments, the plurality of vanes extend from the hub to the tubular member around a portion between 130 degrees and 230 degrees of a circumference of the tubular member.

In some embodiments, a plurality of throughholes are defined through the blocking member.

In some embodiments, a slit is defined through at least one vane of the plurality of vanes.

In some embodiments, an assembly for an aftertreatment system comprises: a hub, a tubular member disposed circumferentially around the hub and defining a reductant entry port, and a plurality of vanes extending from the hub to the tubular member such that openings are defined between adjacent vanes of the plurality of vanes to allow an exhaust gas to flow therethrough such that the plurality of vanes swirl the exhaust gas in a circumferential direction with respect to an exhaust gas flow path of the exhaust gas, a mixer central axis of the mixer defined through the hub is configured to be radially offset with respect to a housing central axis of a housing within which the mixer is positionable at a location upstream of the mixer, wherein the reductant entry port is axially aligned with a central portion of the exhaust gas flow path and configured to allow insertion of the reductant at a non-zero angle with respect to the central portion opposite the circumferential direction.

In some embodiments, the mixer central axis is horizontally offset from the housing central axis.

In some embodiments, the mixer central axis is vertically offset from the housing central axis.

In some embodiments, the non-zero angle is in a range of 5 degrees to 60 degrees with respect to the transverse axis.

In some embodiments, an auxiliary opening is defined in the tubular member proximate to the reductant entry port.

In some embodiments, the assembly further comprises: a blocking member extending from the hub to the tubular member.

In some embodiments, the plurality of vanes extend from the hub to the tubular member around a portion between 130 degrees and 230 degrees of a circumference of the tubular member.

In some embodiments, a plurality of throughholes are defined through the blocking member.

In some embodiments, a slit is defined through at least one vane of the plurality of vanes.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing in this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
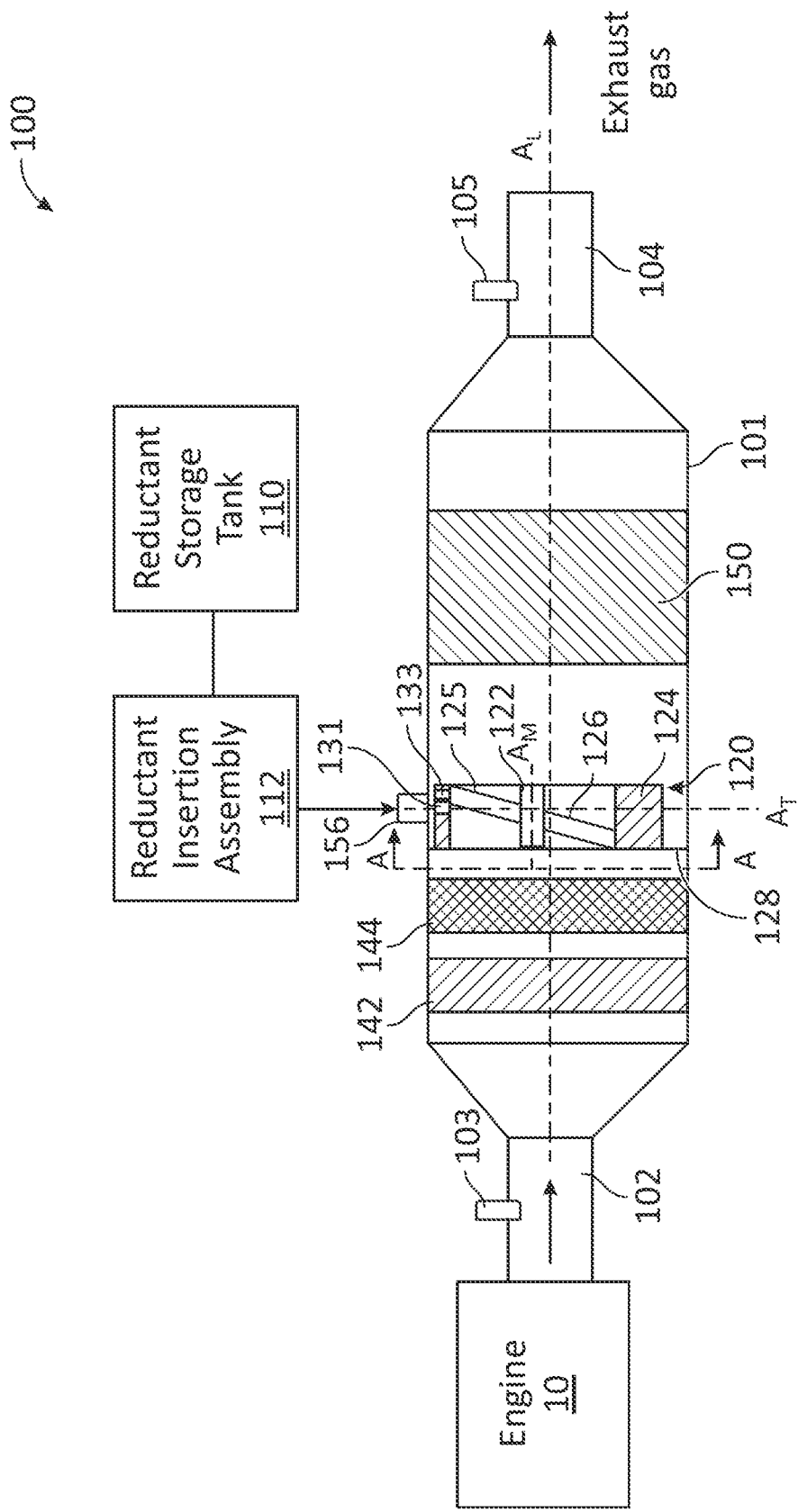
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to mixers for promoting mixing of reductant with exhaust gas flowing through an aftertreatment system and reduce reductant deposits. In particular, embodiments described herein include a multi-vane mixer that includes a central hub defining a flow channel that is radially offset from a longitudinal axis of an aftertreatment housing, and a reductant injector that inserts reductant at a non-zero angle with respect to the transverse axis of the aftertreatment system and opposite a circumferential direction of rotation of the exhaust gas that is caused by the mixer.

Reductant deposits are a significant concern in operation of aftertreatment systems. Reductant deposits can build up in the SCR system or other components of the aftertreatment system and lead to reduction in a SCR catalytic conversion efficiency (CE) of the SCR system and increase backpressure. Various mixers have been used to facilitate mixing of the reductant with the exhaust gas to reduce reductant deposits. Other solutions have used asymmetrically mounted reductant injectors. Such reductant injectors, however can increase the risk of reductant deposit formation at the reductant injector tip due to the presence of flow recirculation in a cavity which the reductant injector is mounted. Moreover, asymmetrically mounted reductant injection typically cannot avoid impingement on the walls of the reductant port (in which the reductant injector is mounted) without increasing the size of this port, when a spray with large cone angle is used. Increasing the size of the reductant port may increase the amount of exhaust assist flow, i.e., flow of exhaust gas through the reductant port in a direction transverse to the main gas flow. This in turn may reduce the impact of interception of spray droplets with exhaust gas streams from the main flow that promotes reductant mixing and reduces reductant deposits, because the larger amount of exhaust gas entering the larger reductant port reduces the amount of main flow and weakens it.

In contrast, various embodiments of the mixers for mixing a reductant with an exhaust gas may provide one or more benefits including, for example: (1) delivering highly uniform flow and reductant profile at an inlet of a downstream reductant injector; (2) reducing pressure drop; (3) allowing for dynamic control of spatial distribution of reductant droplets under varying operating conditions; (4) allowing integration of wide reductant spray cone angles; and (5) reduce flow recirculation near a tip of a reductant injector, thereby reducing risk of reductant deposits near a tip of a reductant injector that is symmetrically mounted as well as in the mixer and in a downstream SCR system.

FIG. 1 is a schematic illustration of an aftertreatment system 100, according to an embodiment. The aftertreatment system 100 is configured to receive exhaust gas (e.g., diesel exhaust gas from an engine 10) and treat constituents (e.g., particulate matter, $NO_x$, CO, $CO_2$) of the exhaust gas. The aftertreatment system 100 includes a reductant storage tank 110, a reductant insertion assembly 112, a mixer 120, and a SCR system 150, and may also include an oxidation catalyst 142, and a filter 144.

The engine 10 may include, for example, a diesel engine, a gasoline engine, a natural gas engine, a dual fuel engine, a biodiesel engine, an E-85 engine, or any other suitable engine. In some embodiments, the engine 10 includes a diesel engine. The engine 10 combusts fuel and generates an exhaust gas that includes $NO_x$, CO, $CO_2$, and other constituents.

The aftertreatment system 100 includes a housing 101 in which components of the aftertreatment system 100 are disposed. The housing 101 may be formed from a rigid, heat-resistant and corrosion-resistant material, for example, stainless steel, iron, aluminum, metals, ceramics, or any other suitable material. The housing 101 may have any suitable cross-section, for example, circular, square, rectangular, oval, elliptical, polygonal, or any other suitable shape. The housing 101 defines a housing central axis $A_L$. In some embodiments, the housing 101 may have a circular cross-section and the housing central axis $A_L$ is an axis extending longitudinally through a center point of the housing 101 (i.e., a point equidistant from the periphery of the housing 101). In other embodiments, in which the housing 101 has a non-circular cross section (e.g., square, rectangular, oval, elliptical, polygonal, or any other suitable cross-section), the housing central axis $A_L$ is an axis extending longitudinally through a geometric center or centroid of the cross-sectional shape defined by the housing 101 (i.e., the arithmetic mean position of all the points in the cross-sectional shape defined by the housing 101).

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter and/or reduce constituents of the exhaust gas such as $NO_x$ gases, CO, unburnt hydrocarbons, etc. included in the exhaust gas produced by the SCR system 150).

A first sensor 103 may be positioned in the inlet conduit 102. The first sensor 103 may comprise a $NO_x$ sensor configured to measure an amount of $NO_x$ gases included in the exhaust gas flowing into the SCR system 150 and may include a physical sensor or a virtual sensor. In various embodiments, a temperature sensor, a pressure sensor, an oxygen sensor, or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_x$ sensor configured to determine an amount of $NO_x$ gases expelled into the environment after passing through the SCR system 150. In other embodiments, the second sensor 105 may comprise a particulate matter sensor configured to determine an amount of particulate matter in the exhaust gas being expelled into the environment. In still other embodiments, the second sensor 105 may comprise an ammonia sensor configured to measure an amount of ammonia in the exhaust gas flowing out of the SCR system 150, i.e., determine the ammonia slip. This may be used as a measure of a catalytic conversion efficiency of the SCR system 150 for adjusting an amount of reductant to be inserted into the SCR system 150, and/or adjusting a temperature of the SCR system 150 so as to allow the SCR system 150 to effectively use the ammonia for catalytic decomposition of the $NO_x$ gases included in the exhaust gas flowing therethrough. In some embodiments, an ammonia oxidation (AMOX) catalyst may be positioned downstream of the SCR system 150 so as to decompose any unreacted ammonia in the exhaust gas downstream of the SCR system 150.

The aftertreatment system 100 may include various other components such as an oxidation catalyst 142 (e.g., a diesel oxidation catalyst) positioned upstream of the SCR system 150 and configured to decompose unburnt hydrocarbons and/or CO included in the exhaust gas. In some embodiments, a filter 144 may be disposed downstream of the oxidation catalyst and upstream of the SCR system 150 and configured to remove particulate matter (e.g., soot, debris, inorganic particles, etc.) from the exhaust gas.

The SCR system 150 is formulated to decompose constituents of an exhaust gas flowing therethrough in the presence of a reductant, as described herein. In some embodiments, the SCR system 150 may include a selective catalytic reduction filter (SCRF). The SCR system 150 includes a catalyst formulated to catalyze the decomposition of $NO_x$ gases. Any suitable catalyst may be used such as, for example, platinum, palladium, rhodium, cerium, iron, manganese, copper, vanadium based catalyst, any other suitable catalyst, or a combination thereof. The catalyst may be disposed on a suitable substrate such as, for example, a ceramic (e.g., cordierite) or metallic (e.g., kanthal) monolith core which can, for example, define a honeycomb structure. A washcoat can also be used as a carrier material for the SCR system 150. Such washcoat materials may comprise, for example, aluminum oxide, titanium dioxide, silicon dioxide, any other suitable washcoat material, or a combination thereof.

A reductant injector 156 is disposed on the housing 101 upstream of the SCR system 150 and configured to insert a reductant into the exhaust gas flowing through the housing 101. The reductant injector 156 is mounted symmetrically on a sidewall of the housing 101 such that the reductant injector 156 is mounted in axial alignment with a transverse axis $A_T$ of the housing 101, for example, in a reductant port defined in the housing 101, i.e., aligned with a central portion of an exhaust gas flow path of the exhaust gas flowing through the housing 101. As described herein, the term "transverse axis" implies an axis of the housing 101 that is perpendicular to the housing central axis $A_L$ of the housing 101. In various embodiments, the reductant injector 156 may comprise a nozzle having predetermined diameter, and configured to insert a spray cone SC of the reductant into the exhaust gas.

The reductant storage tank 110 is structured to store a reductant. The reductant is formulated to facilitate decomposition of the constituents of the exhaust gas (e.g., $NO_x$ gases included in the exhaust gas). Any suitable reductant may be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In some embodiments, the reductant can comprise an aqueous urea solution including 32.5% by mass of urea and 67.5% by mass of deionized water, including 40% by mass of urea and 60% by mass of deionized water, or any other suitable ratio of urea to deionized water.

A reductant insertion assembly 112 is fluidly coupled to the reductant storage tank 110. The reductant insertion assembly 112 is configured to selectively insert the reductant into the exhaust gas. The reductant insertion assembly 112 may comprise various structures to facilitate receipt of the reductant from the reductant storage tank 110 and delivery to the SCR system 150, for example, pumps, valves, screens, filters, etc.

Figure 2:
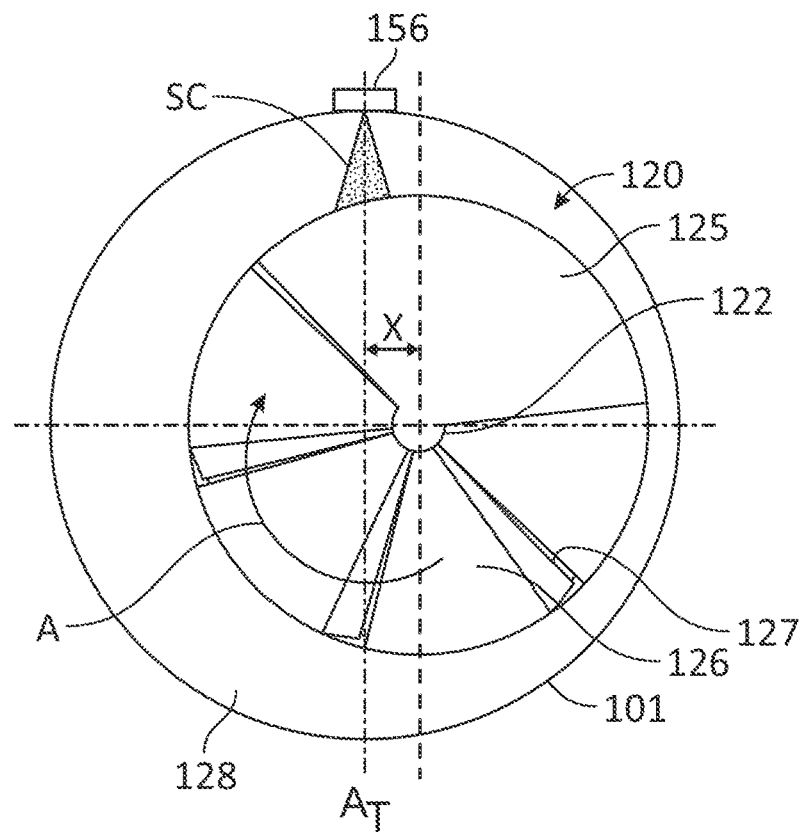
FIG. 2 is a front cross-section view of a housing of an aftertreatment system of FIG. 1 taken along the line A-A in FIG. 1, showing a mixer disposed in the housing and a spray cone produced by a reductant injector mounted on the housing.

A mixer 120 is disposed in the housing 101 upstream of the SCR system 150 proximate to the reductant injector 156 and configured to facilitate mixing of the reductant inserted by the reductant injector 156 with the exhaust gas. Referring also now to FIG. 2, the mixer 120 includes a hub 122. In some embodiments, the hub 122 may be solid. In other embodiments, the hub 122 may define a channel to allow a portion of the exhaust gas to flow therethrough.

A tubular member 124 is disposed circumferentially around the hub 122. The tubular member 124 may be cylindrical in shape. The outer tubular member 124 may have a diameter that is smaller than a diameter of the housing 101. The outer tubular member 124 may have a generally circular cross section and defines a generally linear exhaust flow path. In other embodiments the outer tubular member 124 can have other cross-sectional shapes and the gas flow path through the outer tubular member may be linear or non-linear. For example, the tubular member 124 can have conical, frustoconical, aerodynamic or other shapes. In some embodiment, the tubular member 124 is configured as a venturi body. In such embodiments, the tubular member 124 may have a diameter at an inlet thereof that is larger than an outlet of the tubular member 124.

A plurality of vanes 126 extend from an outer surface of the hub 122 to the tubular member 124 such that openings 127 are defined between adjacent vanes 126 to allow primary streamlines of the exhaust gas to flow therethrough. In some embodiments, the plurality of vanes 126 may include a set of upstream vanes and a set of downstream vanes. The vanes 126 may be inclined at an angle (e.g., in range of 10 degrees to 80 degrees) from the hub to the tubular member 124 so as to cause swirling in the exhaust gas as the exhaust gas flows through the openings 127 in a circumferential direction A with respect to the exhaust gas flow path (e.g., a clock-wise direction). A flange 128 extends radially outwards from a rim of an upstream end of the tubular member 124. The flange 128 may be secured (e.g., welded, or coupled via screws, nuts, bolts, rivets, etc.) to an inner surface of the housing 101 to mount the mixer 120 in the housing 101.

In some embodiments, the blocking member 125 that blocks or otherwise resists the flow of the exhaust gas extend around a portion of the gas flow path not covered by the portion around which the plurality of vanes 126 extend. In some embodiments in which the mixer 120 includes a set of upstream vanes, the blocking member 125 may be located upstream from the reductant entry port 131 on a side of the mixer 120 where the reductant entry port 131 is located. As shown in FIG. 2, the blocking member 125 may include a wall that extends from the hub 122. In other embodiments, the blocking member 125 may be a component separate from the plurality of vanes 126. In some embodiments, the vanes 126 of may extend around a portion between 130° and 230° of a circumference of the tubular member 124. In other embodiments the vanes 126 may extend around a portion between 170° and 190° of the circumference of tubular member 124. In still other embodiments, the vanes 126 may extend around a portion of about 180° of the circumference of the tubular member 124.

A reductant entry port 131 is defined in the tubular member 124 and configured to allow insertion of the reductant into the exhaust gas flow path of the exhaust gas flowing through the mixer 120. In some embodiments, the reductant entry port 131 may be defined upstream of the plurality of vanes. In some embodiments in which the mixer 120 includes a set of upstream vanes and a set of downstream vanes, the reductant entry port 131 may be defined between the set of upstream and downstream vanes. The reductant entry port 131 is axially aligned with a central portion of the exhaust gas flow path (e.g., aligned with the transverse axis $A_T$) and configured to allow insertion of the reductant at a non-zero angle with respect to the central portion opposite the circumferential direction. For example, the reductant injector 156 that is mounted along the transverse axis $A_T$ of the housing 101 is configured to insert a reductant into the exhaust gas through the reductant entry port 131 at a non-zero angle with respect to the transverse axis $A_T$ opposite the circumferential direction in which the exhaust gas swirls. In some embodiments, the tubular member 124 also defines an auxiliary opening 133 proximate to the reductant entry port 131 and is configured to allow an auxiliary stream of exhaust to flow therethrough between the housing 101 and tubular member 124. The auxiliary stream may further facilitate mixing of the reductant with the exhaust gas and reduce reductant deposits, for example, in the reductant entry port.

Reductant spray cones produced by reductant injectors are polydisperse and have a finite width. While spray cone angle (i.e., the angle of spread of the spray cone) is a useful measure of the extent of the spray footprint, another useful metric to assess the degree of dispersion in drop size distribution is the relative span factor (RSF). The RSF is defined as a ratio of a difference between maximum droplet size to minimum droplet size of the reductant to the mean droplet size, and is an indicator of the range of reductant droplet size in the reductant spray relative to mean drop size. A larger RSF indicates a more polydisperse spray. Variations in RSF can impact mixing of the reductant with the exhaust gas.

To facilitate mixing of the sprayed reductant inserted by the symmetrically mounted reductant injector 156 that may have a wide range of RSFs, a mixer central axis $A_M$ of the mixer 120 defined through the hub 122 is radially offset with respect to the housing central axis $A_L$ of the housing 101 such that a flow axis of the exhaust gas at a location in the housing 101 that is upstream of the mixer 120 is also offset from the mixer central axis $A_M$. The plurality of openings 127 defined between the plurality of vanes 126, in addition to causing swirling in the exhaust gas, alter the flow axis of the exhaust gas because of the mixer central axis $A_M$ being offset from the housing central axis $A_L$. The openings 127 direct several primary intercepting exhaust gas streams to selectively alter the trajectory of the reductant spray droplets and to redistribute them. Sprays with various RSF's can be optimally redistributed by varying the vane angle of the plurality of vanes 126 and/or orientations based on the application. The symmetrically mounted reductant injector 156 reduces flow recirculation proximate to the tip of the reductant injector 156 thereby reducing the risk of reductant deposits and allowing large spray cone angles.

In this manner, the mixer 120 provides multistage oblique virtual interception of the reductant droplets by altering the flow axis of the exhaust gas, increasing mixing, and reducing reductant deposits. Virtual interception refers to the ability of the mixer 120 to generate exhaust gas streams that intercept a reductant spray without the use of splash plates or solid devices. Virtual interception selectively alters the trajectory of the reductant droplets and redistributes the reductant droplets. Particularly, the mixer 120 is configured to provide oblique virtual interception because the reductant spray is introduced at a non-zero or oblique angle relative to one or more primary exhaust gas streams produced by the plurality of vanes 126 (as shown in FIG. 3).

In some embodiments, as shown in FIG. 2, the mixer central axis $A_M$ is horizontally offset from the housing central axis $A_L$ of the housing 101 by a distance x (e.g., in a range of 0 to 20 millimeters). The reductant injector 156 is mounted symmetrically with respect to the transverse axis $A_T$ of the housing 101 and configured to insert reductant at an angle of about 0 degrees with respect to a transverse axis $A_T$ of the housing 101 such that a central axis of the spray cone SC generated by the reductant injector 156 is aligned with the transverse axis $A_T$.

Figure 3:
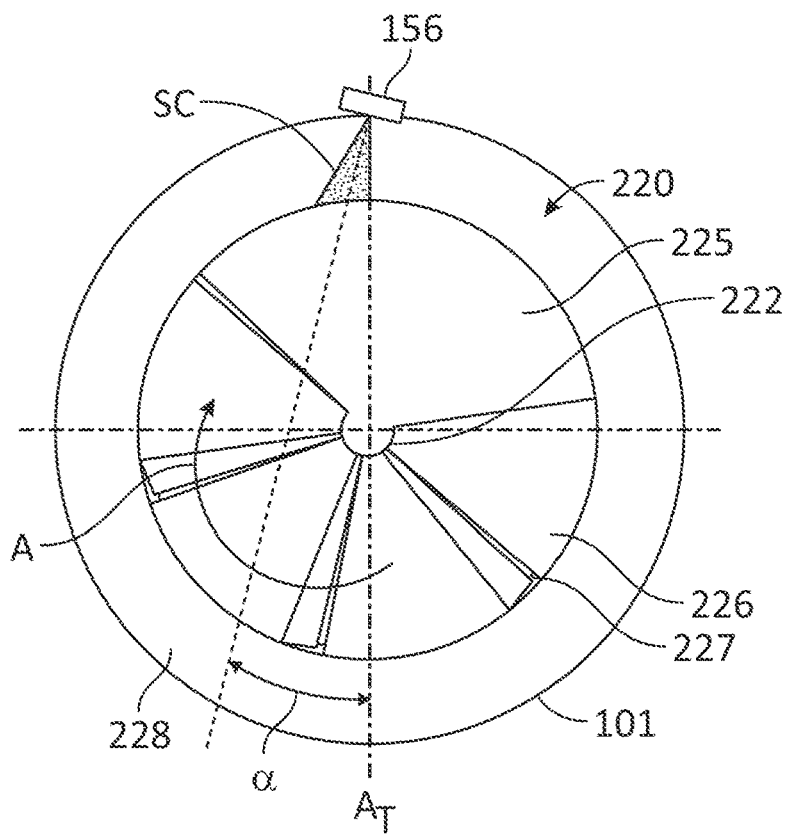
FIG. 3 is a front cross-section view of a housing of an aftertreatment system of FIG. 1 taken along the line A-A in FIG. 1, showing a mixer disposed in the housing and a spray cone produced by a reductant injector mounted on the housing, according to another embodiment.

FIG. 3 shows a mixer 220 disposed in the housing 101 according to another embodiment. The mixer 220 includes a hub 222, a tubular member 224, a plurality of vanes 226, a blocking member 225, and a flange 228, as described with respect to the mixer 120. However, different from the mixer 120, a mixer central axis of the mixer 220 is aligned with the housing central axis $A_L$ of the housing 101, and the reductant injector 156 is configured to insert the reductant at a non-zero angle α, for example, in a range of 5 degrees to 60 degrees with respect to the transverse axis $A_T$ of the housing 101.

Figure 4:
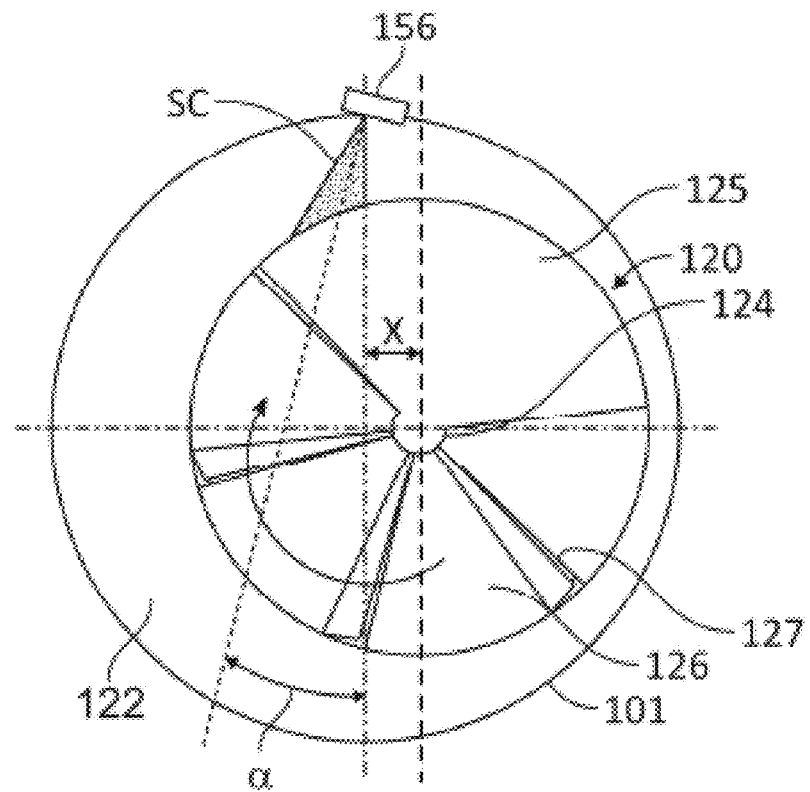
FIG. 4 is a front cross-section view of a housing of an aftertreatment system of FIG. 1 taken along the line A-A in FIG. 1, showing a mixer disposed in the housing and a spray cone produced by a reductant injector mounted on the housing, according to still another embodiment.

FIG. 4 shows the mixer 120 mounted in the housing 101 as described with respect to FIG. 2. Different from FIG. 2, the reductant injector 156 is configured to insert the reductant at an angle α in a range of 5 degrees to 60 degrees with respect to the transverse axis $A_T$ of the housing 101.

Figure 5:
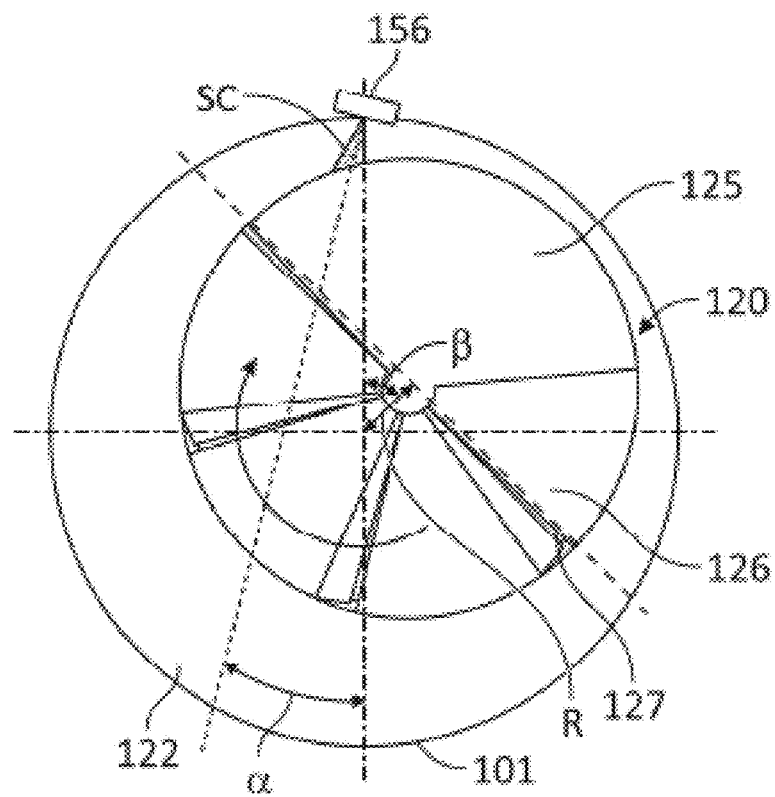
FIG. 5 is a front cross-section view of a housing of an aftertreatment system of FIG. 1 taken along the line A-A in FIG. 1, showing a mixer disposed in the housing and a spray cone produced by a reductant injector mounted on the housing, according to yet another embodiment.

FIG. 5 shows the mixer 120 mounted in the housing 101 such that the mixer central axis $A_M$ of the mixer 120 is also vertically offset from the housing central axis $A_L$ of the housing 101. For example, the mixer central axis of the mixer 120 may be radially offset from the housing central axis $A_L$ by a distance R (e.g., in a range of 0 to 15 millimeters), and located at an angle β from the transverse axis $A_T$ in a range of 30 degrees to 60 degrees.

Figure 6:
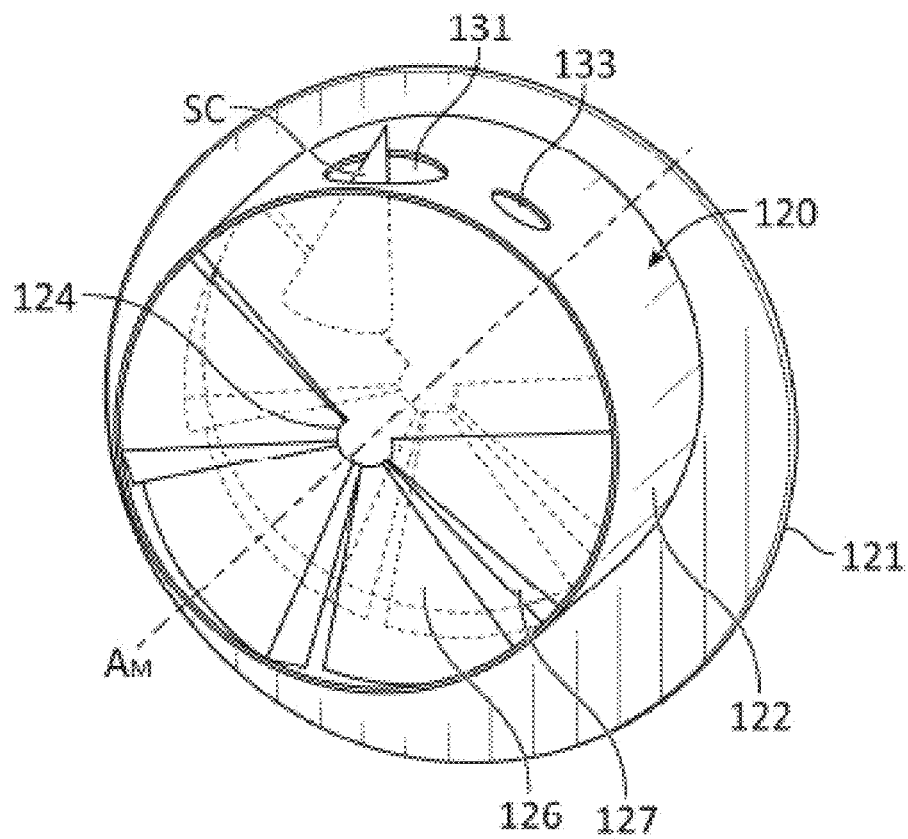
FIG. 6 is a front perspective view of the mixer of FIG. 5.

As previously described herein, in addition to primary intercepting exhaust gas streams due to the portion of the exhaust gas flowing through the openings 127 defined between adjacent vanes 126, one or more auxiliary exhaust gas streams are obtained because of the portion of the exhaust gas flowing through the auxiliary opening 133 in the tubular member 124. The momentum from the auxiliary gas stream or streams helps to dynamically assist or oppose momentum of the primary intercepting exhaust gas streams at various spray cone angles and reductant spray cones with different RSFs. For example, FIG. 6 shows a side perspective view of the mixer 120 mounted in the housing 101 as shown in FIG. 5. The reductant entry port 131 is defined in the tubular member 124 to allow reductant to be inserted into the flow path of the exhaust gas flowing through the mixer 120, and the auxiliary opening 133 is defined proximate to the reductant entry port 131.

Figure 7:
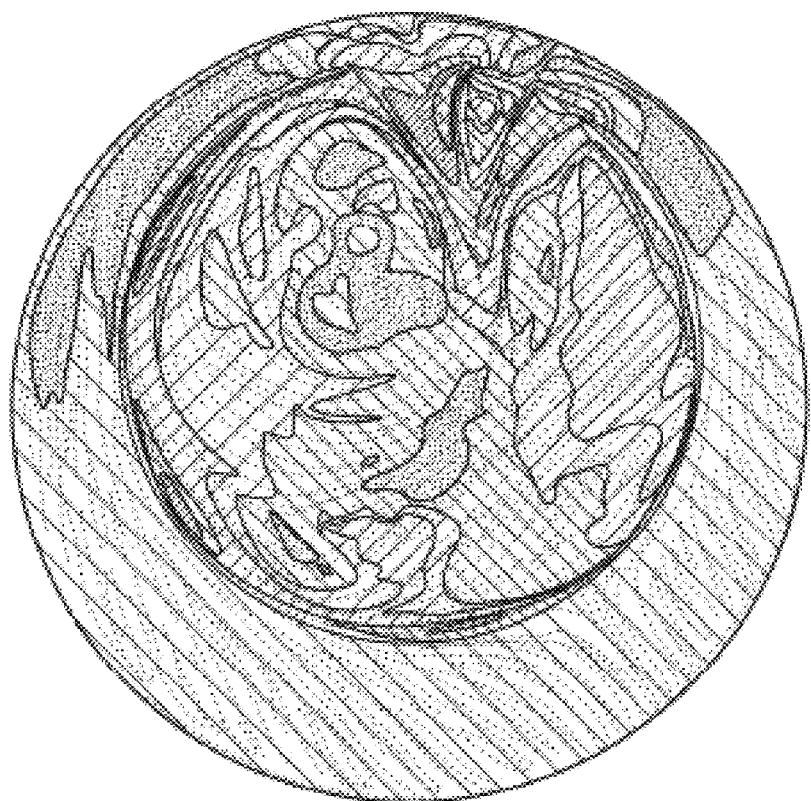
FIG. 7 is a Computational Fluid Dynamic (CFD) simulation showing flow streamlines of an exhaust gas through the mixer of FIG. 6.

FIG. 7 shows flow streamlines of the primary and auxiliary streamlines of the exhaust gas flowing through the mixer 120. The momentum of the auxiliary streams affects the reductant spray cone and alters the reductant spray trajectory at different degrees under different flow conditions, which allows ability for dynamic control of the reductant spray trajectory and uniformity. Therefore, the one or more auxiliary gas streams can be introduced through auxiliary openings to allow closer dynamic control of the spatial distribution of the reductant spray droplets under different operating conditions.

Thus, various combinations of oblique virtual interception of the reductant spray and radial offset of the mixer central axis $A_M$ are possible so as to achieve a desired ratio of exhaust gas to reductant spray momentum. In this manner, optimal spatial distribution of droplets in the exhaust gas can be achieved. All such configurations are contemplated and should be understood as being encompassed by the various embodiments described in this application.

Figure 8:
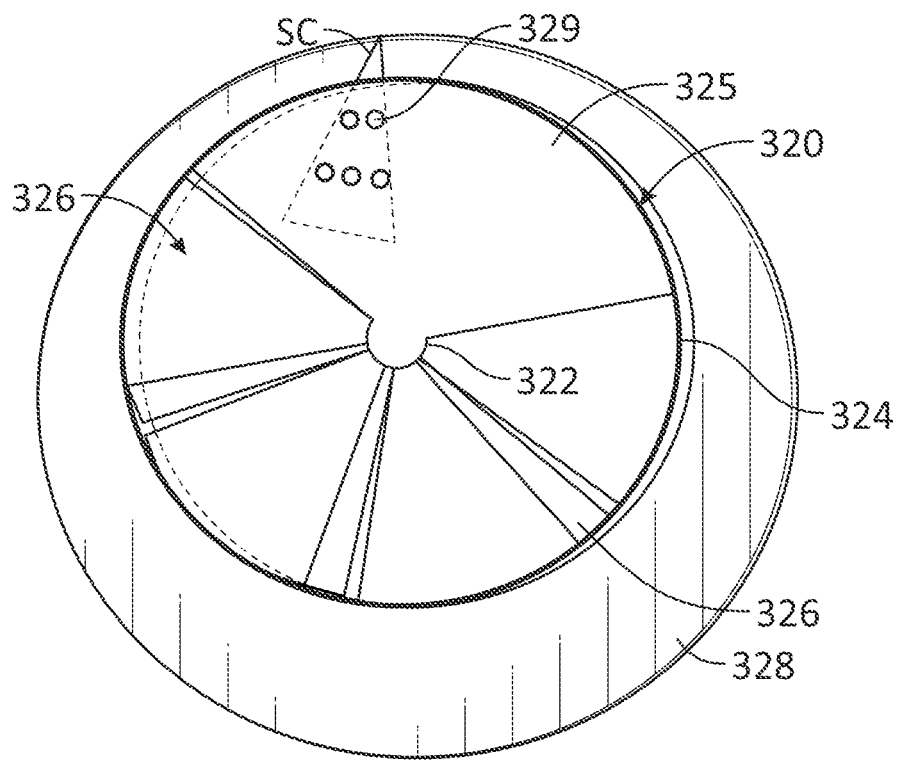
FIG. 8 is a front perspective view of a mixer, according to an embodiment.

In various embodiments, a mixer may be configured to provide a plurality of auxiliary exhaust gas streams. For example, FIG. 8 shows a front perspective view of a mixer 320, according to another embodiment. The mixer 320 includes a tubular member 324, a plurality of vanes 326 including a set of upstream vanes and a set of downstream vanes extending from a hub 322 to the tubular member 324, a flange 328 extending radially outwards from a rim of an upstream end of the tubular member 324, and a blocking member 325 coupled to the hub 322 associated with the downstream vanes 326. A reductant injector is disposed to insert a reductant spray cone SC between the upstream vanes and the downstream vanes 326 of the plurality of vanes 326. The blocking member 325, which is located proximate to a location where the spray cone SC is inserted, defines a plurality of throughholes 329 therethrough. A plurality of auxiliary exhaust gas streams is produced by the exhaust gas flowing through the throughholes 329 further facilitating mixing of the reductant with the exhaust gas and reducing reductant deposits.

Figure 9:
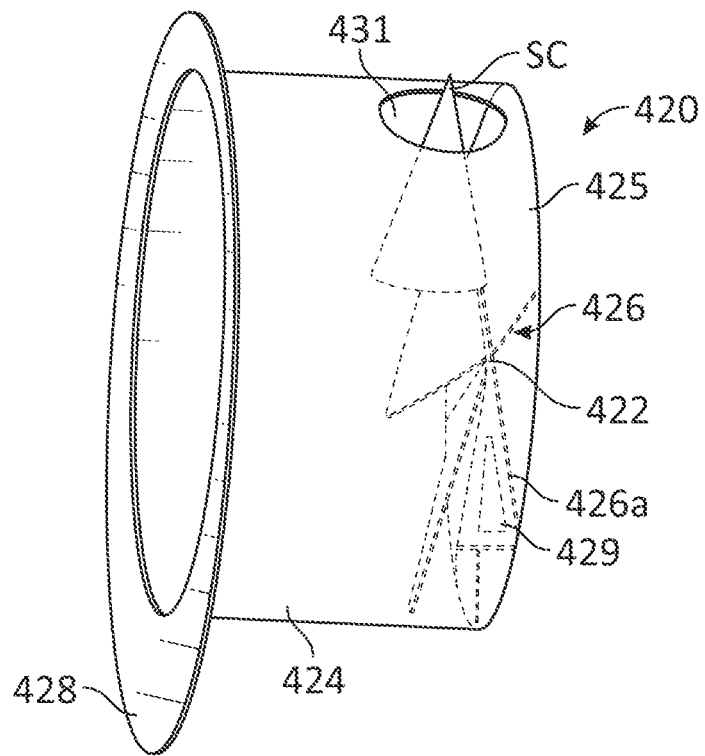
FIG. 9 is a side perspective view of a mixer, according to another embodiment.

FIG. 9 shows a front perspective view of a mixer 420, according to another embodiment. The mixer includes a hub 422, a tubular member 424, a plurality of vanes 426 extending from the hub 422 to the tubular member 424, a blocking member 425 also extending from the hub 422 to the tubular member 424, and a flange 428 extending radially outwards from a rim of an upstream end of the tubular member 424. A mixer central axis of the mixer 420 may be radially offset from a longitudinal axis of housing in which the mixer 420 is disposed. A reductant entry port 431 is defined in the tubular member 424 upstream of the plurality of vanes 426 through which a spray cone of the reductant is inserted into the flow path of the exhaust gas flowing through the mixer 420. A slit 429 is defined through a vane 426a of the plurality of vanes 426, which is located distal from the reductant entry port 431. The slit 429 generates an auxiliary exhaust gas stream in addition to an auxiliary exhaust gas stream produced through the hub 422 so as to facilitate mixing and reduce reductant deposits. While FIG. 9 shows only one vane 426a defining the slit 429, in other embodiments, more than one vane, for example, 2, 3, 4, or all of the vanes of the plurality of vanes 426, may define one or more slits therethrough.

While the present disclosure describes various mixers, systems and methods described herein may include any of the mixers described in U.S. patent application Ser. No. 16/442,014, filed Jun. 14, 2019, the entire disclosure of which is incorporated herein by reference.

Figure 10:
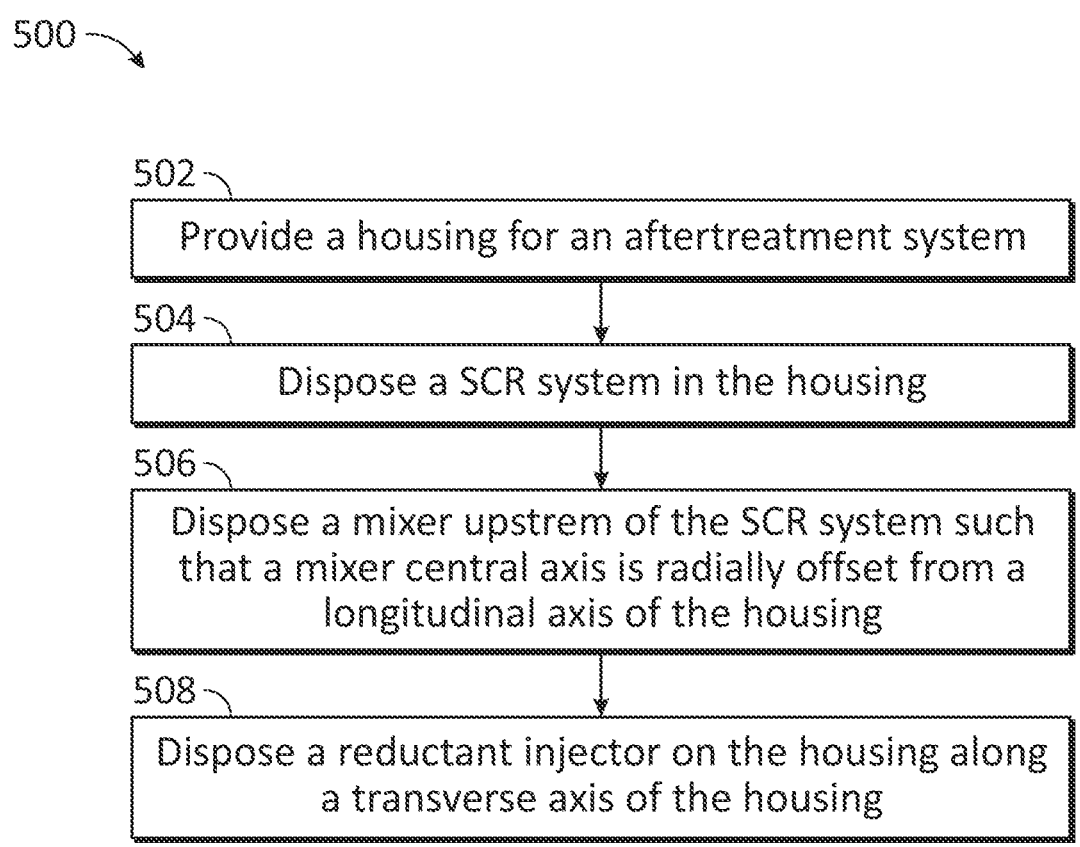
FIG. 10 is a schematic flow chart of a method for fabricating an aftertreatment system, according to an embodiment.

FIG. 10 is a schematic flow chart of a method 500 for fabricating an aftertreatment system (e.g., the aftertreatment system 100), according to an embodiment. The method 500 includes a providing a housing (e.g., the housing 101) for the aftertreatment system, at 502. At 504, a SCR system (e.g., the SCR system 150) is disposed in the housing. At 506, a mixer (e.g., the mixer 120, 220, 320, 420) is disposed in the housing 101 upstream of the SCR system 150. The mixer includes a hub (e.g., the hub 122, 222, 322, 422) and a tubular member (e.g., the tubular member 124, 224, 324, 424) disposed circumferentially around the hub and defining a reductant entry port. A plurality of vanes (e.g., the plurality of vanes 126, 226, 326, 426) extend from the hub to the tubular member such that openings are defined between adjacent vanes of the plurality of vanes to allow exhaust gas to flow therethrough. The plurality of vanes are configured to swirl the exhaust gas in a circumferential direction with respect to an exhaust gas flow path. The mixer is disposed such that a mixer central axis of the mixer defined through the hub is radially offset with respect to a housing central axis of the housing such that a flow axis of the exhaust gas at a location in the housing that is upstream of the mixer is also offset from the mixer central axis. A reductant injector (e.g., reductant injector 156) is disposed on the housing upstream of the SCR system along a transverse axis of the housing, at 508. The reductant injector is configured to insert a reductant into the exhaust gas flowing through the housing through the reductant entry port at a non-zero angle with respect to the transverse axis opposite the circumferential direction of rotation of the exhaust gas.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 to 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for treating constituents of an exhaust gas produced by an engine, comprising:
    a housing defining a housing central axis;
    a selective catalytic reduction (SCR) system disposed in the housing;
    a mixer disposed in the housing upstream of the SCR system, the mixer comprising:
        a hub,
        a tubular member disposed circumferentially around the hub and defining a reductant entry port extending radially through the tubular member, and
        a plurality of vanes extending from the hub to the tubular member such that openings are defined between adjacent vanes of the plurality of vanes to allow the exhaust gas to flow therethrough such that the plurality of vanes swirl the exhaust gas in a circumferential direction with respect to an exhaust gas flow path of the exhaust gas; and
    a reductant injector disposed on the housing upstream of the SCR system and configured to insert reductant into the exhaust gas flowing through the housing through the reductant entry port, wherein the reductant injector is configured to insert the reductant such that, in a view along the housing central axis, a direction of the reductant insertion is at a non-zero angle with respect to a transverse axis of the housing that extends through the reductant injector and through the housing central axis,
    wherein a mixer central axis of the mixer defined through the hub is radially offset with respect to the housing central axis.

2. The aftertreatment system of claim 1, wherein the mixer central axis is horizontally offset from the housing central axis.

3. The aftertreatment system of claim 2, wherein the mixer central axis is vertically offset from the housing central axis.

4. The aftertreatment system of claim 1, wherein the non-zero angle is in a range of 5 degrees to 60 degrees with respect to the transverse axis.

5. The aftertreatment system of claim 1, wherein an auxiliary opening is defined in the tubular member proximate to the reductant entry port.

6. The aftertreatment system of claim 1, wherein the housing defines a circular, square, rectangular, oval, elliptical, or polygonal cross-section.

7. The aftertreatment system of claim 1, wherein the mixer further comprises a flange extending radially outwards from a rim of an upstream end of the tubular member and secured to an inner surface of the housing.

8. The aftertreatment system of claim 1, further comprising:

a blocking member extending from the hub to the tubular member.

9. The aftertreatment system of claim 8, wherein the plurality of vanes extend from the hub to the tubular member around a portion between 130 degrees and 230 degrees of a circumference of the tubular member.

10. The aftertreatment system of claim 8, wherein a plurality of throughholes are defined through the blocking member.

11. The aftertreatment system of claim 1, wherein a slit is defined through at least one vane of the plurality of vanes.

12. An aftertreatment system for treating constituents of an exhaust gas produced by an engine, comprising:
   a housing defining a housing central axis;
   a selective catalytic reduction (SCR) system disposed in the housing; and
   a mixer disposed in the housing upstream of the SCR system, the mixer comprising:
      a hub,
      a tubular member disposed circumferentially around the hub and defining a reductant entry port extending radially through the tubular member, and
      a plurality of vanes extending from the hub to the tubular member such that openings are defined between adjacent vanes of the plurality of vanes to allow the exhaust gas to flow therethrough such that the plurality of vanes swirl the exhaust gas in a circumferential direction with respect to an exhaust gas flow path of the exhaust gas; and
   a reductant injector disposed on the housing upstream of the SCR system and configured to insert reductant into the exhaust gas flowing through the housing through the reductant entry port, wherein the reductant injector is configured to insert the reductant such that, in a view along the housing central axis, a direction of the reductant insertion is at a non-zero angle with respect to a transverse axis of the housing that extends through the reductant injector and through the housing central axis.

13. The mixer of claim 12, wherein a mixer central axis of the mixer is horizontally offset from the housing central axis.

14. The mixer of claim 13, wherein a mixer central axis of the mixer is vertically offset from the housing central axis.

15. The mixer of claim 12, wherein the non-zero angle is in a range of 5 degrees to 60 degrees with respect to a transverse axis of the mixer.

16. The mixer of claim 12, wherein an auxiliary opening is defined in the tubular member proximate to the reductant entry port.

17. The mixer of claim 12, further comprising:
   a blocking member extending from the hub to the tubular member.

18. The mixer of claim 17, wherein the plurality of vanes extend from the hub to the tubular member around a portion between 130 degrees and 230 degrees of a circumference of the tubular member.

19. The mixer of claim 17, wherein a plurality of throughholes are defined through the blocking member.

20. The mixer of claim 12, wherein a slit is defined through at least one vane of the plurality of vanes.

* * * * *